(12) United States Patent
Schaffert

(10) Patent No.: US 9,996,300 B2
(45) Date of Patent: Jun. 12, 2018

(54) INCREASING THE AVAILABLE FLASH MEMORY OF A MICROCONTROLLER

(71) Applicant: Bayerische Motoren Werke Aktiengesellscahft, Munich (DE)

(72) Inventor: Arnd Schaffert, Unterschleissheim (DE)

(*) Notice: Subject to any disclaimer, the term of this patent is extended or adjusted under 35 U.S.C. 154(b) by 0 days. days.

(21) Appl. No.: 15/241,202

(22) Filed: Aug. 19, 2016

(65) Prior Publication Data

US 2016/0357484 A1 Dec. 8, 2016

Related U.S. Application Data

(63) Continuation of application No. PCT/EP2015/051048, filed on Jan. 21, 2015.

(30) Foreign Application Priority Data

Feb. 20, 2014 (DE) .................. 10 2014 203 062

(51) Int. Cl.
*G06F 3/06* (2006.01)
*G06F 9/445* (2018.01)

(52) U.S. Cl.
CPC .......... *G06F 3/0659* (2013.01); *G06F 3/0604* (2013.01); *G06F 3/0608* (2013.01);
(Continued)

(58) Field of Classification Search
CPC .... G06F 3/0604; G06F 3/0611; G06F 3/0631; G06F 3/0664; G06F 3/0683; G06F 12/0238; G06F 12/0246
(Continued)

(56) References Cited

U.S. PATENT DOCUMENTS 6,304,950 B1 * 10/2001 Inoue .................. G06F 12/0638
703/24
2002/0138702 A1 9/2002 Gefen et al.
(Continued)

FOREIGN PATENT DOCUMENTS

DE 103 21 104 A1 11/2004
EP 0 991 081 A1 4/2000
WO WO 2005/055244 A1 6/2005

OTHER PUBLICATIONS

Y. Bahout, "Combined FLASH and EEPROM integrated circuit," Elektronik Industrie, Jan. 1, 1997, p. 48 and pp. 50-51, vol. 28, No. 10, XP002094246.
(Continued)

*Primary Examiner* — Than Nguyen
(74) *Attorney, Agent, or Firm* — Crowell & Moring LLP

(57) ABSTRACT

A method of using flash memories having an electrically erasable programmable read-only memory emulation in a microcontroller, includes: dividing information to be stored in a computer memory into a first piece of information having executable code, and a second piece of information having non-executable code. If a free storage capacity of a first memory is sufficiently large to receive the first piece of information storing the first piece of information in the first memory. If a free storage capacity of a second memory is sufficiently large to receive the second piece of information, storing the second piece of information in the second memory. Or, if the free storage capacity of the second memory is not sufficiently large to receive the second piece of information, switching off an electrically erasable programmable read only memory emulation of the second memory; freeing up the storage capacity that is no longer required due to the switching off, thereby increasing the free storage capacity of the second memory; and storing the second piece of information in the second memory. The first (Continued)

memory permits quicker access to the information stored therein than the second memory.

15 Claims, 4 Drawing Sheets

(52) U.S. Cl.
CPC .......... *G06F 3/0631* (2013.01); *G06F 3/0644* (2013.01); *G06F 3/0664* (2013.01); *G06F 3/0683* (2013.01); *G06F 8/665* (2013.01)

(58) Field of Classification Search
USPC .......................................................... 711/103
See application file for complete search history.

(56) References Cited

U.S. PATENT DOCUMENTS

| | | |
|---|---|---|
| 2005/0055496 A1 | 3/2005 | Nallapa |
| 2008/0001789 A1 | 1/2008 | Dover et al. |
| 2009/0113196 A1* | 4/2009 | Jan .......................... G06F 8/665 713/2 |
| 2012/0131262 A1* | 5/2012 | He ...................... G06F 12/0246 711/103 |

OTHER PUBLICATIONS

International Search Report (PCT/ISA/210) issued in PCT Application No. PCT/EP2015/051048 dated Mar. 24, 2015, with English translation (six (6) pages).

German Search Report issued in counterpart German Application No. 10 2014 203 062.5 dated Nov. 11, 2014, with partial English translation (fifteen (15) pages).

"Electrically Erasable Programmable Read-Only Memory", Wikipedia, Feb. 16, 2014, http://de.wikipedia.org/w/index.php?title=Electrically_Erasable_Programmable_Read-Only_Memory&oldid=127634949, (four (4) pages).

"Specification of Memory Mapping", AUTOSAR, v. 1.4.0, Release 4, Published Dec. 1, 2011, http://www.autosar.org/fileadmin/files/releases/4-0/software-architecture/implementation-integration/standard/AUTOSAR_SWS_MemoryMapping.pdf, (sixty-four (64) pages).

\* cited by examiner

INCREASING THE AVAILABLE FLASH MEMORY OF A MICROCONTROLLER

CROSS REFERENCE TO RELATED APPLICATIONS

This application is a continuation of PCT International Application No. PCT/EP2015/051048, filed Jan. 21, 2015, which claims priority under 35 U.S.C. § 119 from German Patent Application No. 10 2014 203 062.5, filed Feb. 20, 2014, the entire disclosures of which are herein expressly incorporated by reference.

BACKGROUND AND SUMMARY OF THE INVENTION

The present invention relates to a method for providing an increased available flash memory of a microcontroller and to devices in this regard.

Conventional microcontrollers, as they are installed in particular in the electronics of motor vehicles, usually comprise multiple memory blocks, such as RAM, flash ROM, EEPROM, or flash ROM having EEPROM emulation. In particular, microcontrollers comprising flash ROM having EEPROM emulation are frequently installed in vehicle electronics as an alternative to the more cost-intensive microcontrollers comprising EEPROM. The program conventionally runs only from the code area of the microcontroller, which is to say from the flash ROM memory having EEPROM emulation. Once this area of the memory is full, the microcontroller cannot receive any further program code.

Long product cycles exist in particular in motor vehicle construction, whereby a microcontroller that is incorporated in the design is no longer replaced by another microcontroller to the extent possible during the particular product life cycle. However, since progressing dynamics, for example of comfort functions in motor vehicles, leads to an increased need for software changes for individual motor vehicle components even during a product cycle, it is an increasingly frequent occurrence that the program code of a microcontroller increases within the product cycle. It is therefore possible that existing memory reserves of an installed microcontroller decrease within the product cycle of the motor vehicle, or that these are used up by software updates, such as a firmware update of a control electronics system, for example. In the worst case, the required storage capacity in the particular microcontroller of a corresponding control electronics system is no longer sufficient, for example, to install a safety-critical firmware update. If this is the case, a larger derivative of the particular microcontroller must be installed, if this is even available. Otherwise, the microcontroller family must be replaced, which involves a corresponding high effort. Both generally result in increased costs.

It would therefore be desirable to provide an option that renders a replacement of components unnecessary in such critical cases. It is the object of the invention to provide an improved memory type for a microcontroller, which avoids, or at least reduces, some of the disadvantages known from the prior art.

The object is attained according to the invention by a method for using a flash memory in a microcontroller according to embodiments of the invention, as well as by the microcontroller and a vehicle equipped with such a microcontroller.

The method makes use of flash memory in a microcontroller having electrically erasable programmable read-only memory emulation. The method includes the following acts: dividing information to be stored in a computer memory into a first piece of information having executable code and a second piece of information having non-executable code. If a free storage capacity of a first memory is sufficiently large to receive the first piece of information, storing the first piece of information in the first memory. If a free storage capacity of a second memory is sufficiently large to receive the second piece of information, storing the second piece of information in the second memory. Or, if the free storage capacity of the second memory is not sufficiently large to receive the second piece of information, shutting off an electrically erasable programmable read-only memory emulation of the second memory; freeing up the storage capacity no longer required as a result of the shutting off the electrically erasable programmable read-only memory emulation of the second memory, whereby the free storage capacity of the second memory is increased; and storing the second piece of information in the second memory. Thereby, the first memory allows faster access to the pieces of information stored therein than the second memory.

A microcontroller within the meaning of the invention may be understood to be a chip or else a chip electronics, in which memory is already provided, preferably at least one first memory having fast memory access and a second memory having slower memory access. Such a microcontroller can be provided in control units, for example in motor vehicles, and can assume appropriate tasks, such as engine management in a motor vehicle by way of integrated and/or installable program code.

Within the meaning of the invention, a memory shall be understood to mean a RAM memory, and in particular a flash memory or a flash memory having EEPROM emulation.

The first memory shall preferably be understood to mean a RAM memory.

The second memory shall preferably be understood to mean a flash memory having EEPROM emulation.

Instead of a RAM memory, or a flash memory having EEPROM emulation, however, it is also possible to use a respective other memory that has accordingly similar properties.

A "flash memory" within the meaning of the invention may mean an electrical engineering component acting as a digital memory. A flash memory can ensure a non-volatile storage of pieces of digital information at simultaneous low energy consumption. Flash memories are portable and miniaturized; however, in contrast to a conventional electrically erasable programmable read-only memory (EEPROM), it is not possible to individually erase the smallest addressable memory units. The main difference between a flash memory and an EEPROM memory is therefore that each memory cell of an EEPROM memory can be individually erased and written to. While memory cells of a flash memory can be individually written to, these cannot be individually erased. Only an entire program memory page can be erased at a time. To avoid this problem, flash memories having EEPROM emulation are used. Essentially, there are two approaches with EEPROM emulation in the flash program memory: a) Writing to and erasing from a program memory page takes place every time that data is to be saved to the memory. This method has the disadvantage that the memories can only be written to up to 10,000 times. This method can be used for variables that require only little change over the life of the product. b) All data is stored consecutively in one or more flash pages. Once the page has been fully written with data, the page may be erased and re-written again. The advantage of this method is that the number of write cycles for the variables is increased by the factor "page size divided by number of variables." However, the total storage capacity present on the memory is several times greater than the available storage capacity of the memory.

Available storage capacity within the meaning of the invention shall therefore be understood to mean the storage capacity that is addressable in the memory. Therefore, this refers to the memory area in which pieces of information can be stored in the memory. The available storage capacity of the memory can deviate significantly from the maximum present storage capacity of the memory.

A first piece of information having executable code within the meaning of the invention can mean any executable code, and in particular can mean the actual program code.

A second piece of information having non-executable code within the meaning of the invention can mean any non-executable code, and in particular can mean data such as constants, variables, and the like.

The pure data portion is therefore stored in the second memory, whereas the pure program data portion is stored in the first, faster memory.

The teaching according to the invention achieves the advantage that the available storage capacity of the second memory can be increased, dispensing with the EEPROM emulation of the memory. In doing so, a larger program can be used in the microcontroller than was originally provided. Thus, if the program code to be used in the microcontroller, for example in the case of a firmware update, is greater than the maximum originally provided for the microcontroller, it is possible, by means of the teaching according to the invention, to free up memory reserves intended for other purposes, such as EEPROM emulation, for example, so as to still be able to receive the program code, which in fact is too large, in the microcontroller. In doing so, costs that would be incurred due to a corresponding hardware replacement and/or a hardware upgrade are reduced or saved entirely. Furthermore, the program execution speed can be optimized by keeping the executable portion of the program available in the faster memory, and keeping only the data portion of the program in the slower memory.

What is more, an object of the invention relates to a method for making improved use of flash memory in a microcontroller having electrically erasable programmable read-only memory emulation, with the method comprising the following acts: dividing information to be stored to a computer memory into a first piece of information having executable code and a second piece of information having non-executable code. If a free storage capacity of a first memory is sufficiently large to receive the first piece of information: storing the first piece of information in the first memory. If the free storage capacity of the first memory is sufficiently large to receive the second piece of information, storing the second piece of information in the first memory. Or, if the free storage capacity of the first memory is not sufficiently large to receive the second piece of information, dividing the second piece of information into a first portion and into a second portion, wherein the first portion of the second piece of information has a size that, at a maximum, corresponds to the free storage capacity of the first memory; storing the first portion of the second piece of information in the first memory; and, if the free storage capacity of a second memory is sufficiently large to receive the second portion of the second piece of information, storing the second portion of the second piece of information in the second memory. Or, if the free storage capacity of the second memory is not sufficiently large to receive the second piece of information, shutting off an electrically erasable programmable read-only memory emulation of the second memory; freeing up the storage capacity no longer required as a result of shutting off the electrically erasable programmable read-only memory emulation of the second memory, whereby the free storage capacity of the second memory is increased; and storing the second portion of the second piece of information in the second memory. In doing so, the first memory allows faster access to the pieces of information stored therein than the second memory.

The teaching according to the invention achieves the advantage that the program execution speed is improved by keeping the executable portion of the program available in the faster memory, and using the memory of the fast memory that is still available thereafter for at least a portion of the program data. This can further increase the execution speed of the program. Furthermore, maximum use of the overall available storage capacity of the first and second memories is possible, whereby even larger programs can be kept available in the microcontroller. Furthermore, the proposed method can likewise have all the advantages of the aforementioned method.

The invention further relates to a microcontroller device, comprising a first memory and a second memory. The first memory allows random access, the execution of executable code, and faster access to the pieces of information stored therein than the second memory. The second memory is a flash memory, which allows electrically erasable programmable read-only memory emulation. The electrically erasable programmable read-only memory emulation of the second memory can be shut off, and the microcontroller device is configured to carry out any one of the methods according to the invention.

The teaching according to the invention achieves the advantage that a microcontroller device can be provided in which the total available storage capacity of the microcontroller is maximally utilized, whereby larger programs are kept available than in known microcontroller devices having the same nominal storage capacity.

Nominal storage capacity within the meaning of the invention shall be understood to mean the provided available storage capacity. Said storage capacity can deviate significantly from the maximum present storage capacity of the memory.

The invention further relates to a motor vehicle, comprising any microcontroller device according to embodiments the invention.

The teaching according to the invention achieves the advantage that a motor vehicle can be provided, in the control unit and/or control units of which a larger program can be kept available than in known motor vehicles having control units that include known microcontrollers having a comparable nominal storage capacity.

Before embodiments of the invention will be described in greater detail hereafter, it shall first be noted that the invention is not limited to the described components or the described method acts. Furthermore, the terminology used also does not represent any restriction, but is merely of an exemplary nature. To the extent that both the description and the claims use the singular form, the plural shall be covered in each case, unless the context explicitly precludes this.

Hereafter, further exemplary embodiments of the first method according to the invention are described.

Corresponding to a first exemplary embodiment, the method furthermore includes the following acts: if the free storage capacity of the second memory is not sufficiently large to receive the second piece of information after the storage capacity that is no longer required as a result of shutting off the electrically erasable programmable read-only memory emulation of the second memory has been freed up: dividing the second piece of information into a first portion and into a second portion, wherein the first portion of the second piece of information has a size that, at a maximum, corresponds to the free storage capacity of the second memory; storing the first portion of the second piece of information in the second memory; and storing the second portion of the second piece of information in a third memory. In doing so, first memory allows faster access to the pieces of information stored therein than the third memory.

This embodiment has the advantage that, in the case where the available storage capacity of the microcontroller should not be sufficient even after the available storage capacity has been increased by freeing up memory areas no longer required for EEPROM emulation, the increased available storage capacity is utilized, and an additional inexpensive memory can be used only for the remaining non-executable program portion which cannot be received. Said memory may also have a comparatively lower storage capacity and grant slower access to data, and thus is cost-effective to provide in the microcontroller, or outside the microcontroller, or to retrofit outside the microcontroller.

Hereafter, further exemplary embodiments of the further method according to the invention are described.

Corresponding to a first exemplary embodiment, the method furthermore includes the following acts: if the free storage capacity of the second memory is not sufficiently large to receive the second portion of the second piece of information after the storage capacity that is no longer required as a result of shutting off the electrically erasable programmable read-only memory emulation of the second memory has been freed up, dividing the second portion of the second piece of information into a first sub-portion and into a second sub-portion, wherein the first sub-portion of the second portion of the second piece of information has a size that, at a maximum, corresponds to the free storage capacity of the second memory; storing the first sub-portion of the second portion of the second piece of information in the second memory; and storing the second sub-portion of the second portion of the second piece of information in a third memory. In doing so, the first memory allows faster access to the pieces of information stored therein than the third memory.

This embodiment has the advantage that only a potentially even smaller program portion may remain, which cannot be accommodated in the microcontroller, and thus an even smaller third memory may be providable. Furthermore, the proposed exemplary embodiment can likewise have all the advantages of the aforementioned exemplary embodiment.

Hereafter, further exemplary embodiments of the above-described methods according to the invention are described.

Corresponding to a further exemplary embodiment, the method further includes the following acts: if the free storage capacity of the first memory is not sufficiently large to receive the first piece of information: dividing the first piece of information into a first portion and into a second portion, wherein the first portion of the first piece of information has a size that, at a maximum, corresponds to the free storage capacity of the first memory; storing the first portion of the first piece of information in the first memory; and storing the second portion of the first piece of information in the second memory.

This embodiment has the advantage that it can become possible, even in the case where the first piece of information cannot be completely received in the fast memory, to dispense with a hardware upgrade and/or a hardware retrofit of the microcontroller and/or of the corresponding control unit by dividing the first piece of information and storing a portion of the first piece of information in the second, slower memory.

Corresponding to a further exemplary embodiment, the method further includes the following acts: if the free storage capacity of the second memory is not sufficiently large to receive the second portion of the first piece of information: shutting off the electrically erasable programmable read-only memory emulation of the second memory; freeing up the storage capacity no longer required as a result of shutting off the electrically erasable programmable read-only memory emulation of the second memory, whereby the free storage capacity of the second memory is increased; and storing the second portion of the first piece of information in the second memory.

This embodiment has the advantage that it can become possible, even in the case where the first piece of information cannot be completely received in the fast memory and the portion of the first piece of information that cannot be accommodated in the fast memory also cannot be accommodated in the nominally available memory of the second memory, to still store the entire code in the microcontroller, and thus save retrofitting costs, by freeing up the memory area provided for the EEPROM emulation.

Corresponding to a further exemplary embodiment, the method further includes the following acts: if the free storage capacity of the second memory is sufficiently large to receive the second piece of information after shutting off the electrically erasable programmable read-only memory emulation of the second memory, storing the second piece of information in the second memory. Or, if the free storage capacity of the second memory is not sufficiently large to receive the second piece of information after shutting off the electrically erasable programmable read-only memory emulation of the second memory, dividing the second piece of information into a first portion and into a second portion, wherein the first portion of the second piece of information has a size that, at a maximum, corresponds to the free storage capacity of the second memory; storing the first portion of the second piece of information in the second memory; and storing the second portion of the second piece of information in a third memory.

The third memory within the meaning of the invention may be a slower memory. It may also be a flash memory with or without EEPROM emulation, or else an EEPROM memory itself.

This embodiment has the advantage that the increased available storage capacity can be utilized even better, and an additional inexpensive memory can be used only for the remaining non-executable program portion, which cannot be received in the microcontroller. Said memory may also have a comparatively lower storage capacity and grant slower access to data, and is therefore cost-effective to provide in the microcontroller, or outside the microcontroller, or to retrofit outside the microcontroller.

Corresponding to a further exemplary embodiment, the method further includes the following acts: if the free storage capacity of the second memory is not sufficiently large to receive the second portion of the first piece of information after the storage capacity that is no longer required as a result of shutting off the electrically erasable programmable read-only memory emulation of the second memory has been freed up, dividing the second portion of the first piece of information into a first sub-portion and into a second sub-portion, wherein the first sub-portion of the second portion of the first piece of information has a size that, at a maximum, corresponds to the free storage capacity of the second memory; storing the first sub-portion of the second portion of the first piece of information in the second memory; storing the second sub-portion of the second portion of the first piece of information in a third memory; and storing the second piece of information in the third memory and/or a further memory. In doing so, the second memory allows faster access to the pieces of information stored therein than the third and/or further memory.

This embodiment has the advantage that the executable program code is accommodated initially in accordance with the access speeds of the two memories, and the data portion of the program code can be stored in corresponding further memories. In doing so, initially fewer speed-critical program portions are stored outside the microcontroller if the storage capacity of the microcontroller should not be sufficiently large to receive the entire program code.

Corresponding to a further exemplary embodiment, the method further includes the following acts: if the free storage capacity of the second memory is sufficiently large to receive the second piece of information, storing the second piece of information in the second memory. Or, if the free storage capacity of the second memory is not sufficiently large to receive the second piece of information, shutting off the electrically erasable programmable read-only memory emulation of the second memory; freeing up the storage capacity no longer required as a result of shutting off the electrically erasable programmable read-only memory emulation of the second memory, whereby the free storage capacity of the second memory is increased; and storing the second piece of information in the second memory.

This embodiment has the advantage that the executable program code is initially accommodated in accordance with the access speeds of the two memories, and the data portion of the program code can be stored in corresponding downstream memories. Furthermore, first the available storage capacity is increased before a further memory has to be used. In doing so, initially fewer speed-critical program portions are stored outside the microcontroller if the storage capacity of the microcontroller should not be sufficiently large to receive the entire program code.

Corresponding to a further exemplary embodiment, the method includes the following acts: if the free storage capacity of the second memory is not sufficiently large to receive the second piece of information after the storage capacity that is no longer required as a result of shutting off the electrically erasable programmable read-only memory emulation of the second memory has been freed up, dividing the second piece of information into a first portion and into a second portion, wherein the first portion of the second piece of information has a size that, at a maximum, corresponds to the free storage capacity of the second memory; storing the first portion of the second piece of information in the second memory; and storing the second portion of the second piece of information in a third memory. In doing so, the second memory allows faster access to the pieces of information stored therein than the third memory.

This embodiment has the advantage that the increased available storage capacity can be utilized even better, and an additional inexpensive memory can be used only for the remaining non-executable program portion, which cannot be received in the microcontroller. This may also have a comparatively lower storage capacity and grant slower access to data, and is therefore cost-effective to provide in the microcontroller, or outside the microcontroller, or to retrofit outside the microcontroller.

Corresponding to a further exemplary embodiment, the method furthermore includes the following acts: prior to storing the corresponding information, the corresponding portion of the corresponding information, or the corresponding sub-portion of the corresponding portion of the corresponding information, in the corresponding memory, expanding the corresponding information, the corresponding portion of the corresponding information, or the corresponding sub-portion of the corresponding portion of the corresponding information from the second memory, the third memory and/or the further memory. In doing so, the first memory allows faster access to the pieces of information stored therein than the further memory.

Expanding a piece of information within the meaning of the invention shall be understood to mean that a piece of information, which was previously stored in compressed form in a memory, is expanded back to the source size thereof, which is to say the compression of the information is reversed.

This embodiment has the advantage that the program code can initially be kept available on the microcontroller, or be installed thereon, in compressed form, and can be expanded only as needed to the corresponding memories of the microcontroller. It can therefore become possible that no additional memory is required for keeping the program code available and/or for installing the same. This can again save costs.

Corresponding to a further exemplary embodiment, the method, after shutting off the electrically erasable programmable read-only memory emulation of the second memory, furthermore includes that the storing of the second piece of information in the second memory is preferably carried out in that portion of the second memory which was freed up by shutting off the electrically erasable programmable read-only memory emulation of the second memory.

This embodiment has the advantage the second piece of information can be assigned a memory area in which usually no program code is executable. Said memory area is then no longer available for the first piece of information, and can therefore not negatively impact the executability of the code of the first piece of information.

Hereafter, further exemplary embodiments of the microcontroller device are described.

Corresponding to a first exemplary embodiment, the device has a third memory. The third memory allows faster access to the pieces of information stored therein than the second memory. The third memory is preferably an electrically erasable programmable read-only memory.

Because an EEPROM is excellently suited for storing smaller amounts of data, in which the information must be preserved even when no supply voltage is applied or in which individual memory elements or data words are easy to change, this memory is ideally suited for storing at least a portion of the second piece of information. It is also excellently suited for receiving at least a portion of the compressed program code, in particular because the pieces of information can be preserved therein even when no supply voltage is applied.

Instead of an EEPROM, however, another memory having similar properties may be also used.

This embodiment has the advantage that an excellently suited memory can be provided for the non-executable portion of the program code of the microcontroller and/or for the compressed program code.

Corresponding to a further exemplary embodiment, the device furthermore includes a further memory. In doing so, the first memory allows faster access to the pieces of information stored therein than the further memory. Furthermore, the second and/or third memories preferably allow faster access to the pieces of information stored therein than the further memory.

The further memory within the meaning of the invention shall be understood to mean a memory that may be subject to lesser requirements in regard to the access speed and storability of executable program code, for example, than the first memory, and preferably also the second and/or third memories.

This embodiment has the advantage that a further memory can be provided, in which program portions and/or at least portions of the compressed program code can be stored cost-effectively.

The invention therefore allows program code, which conventionally would no longer be completely storable in a corresponding microcontroller, to still be stored in the microcontroller and/or in memories assigned thereto. In this way, upgrade and retrofit costs can be avoided or reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
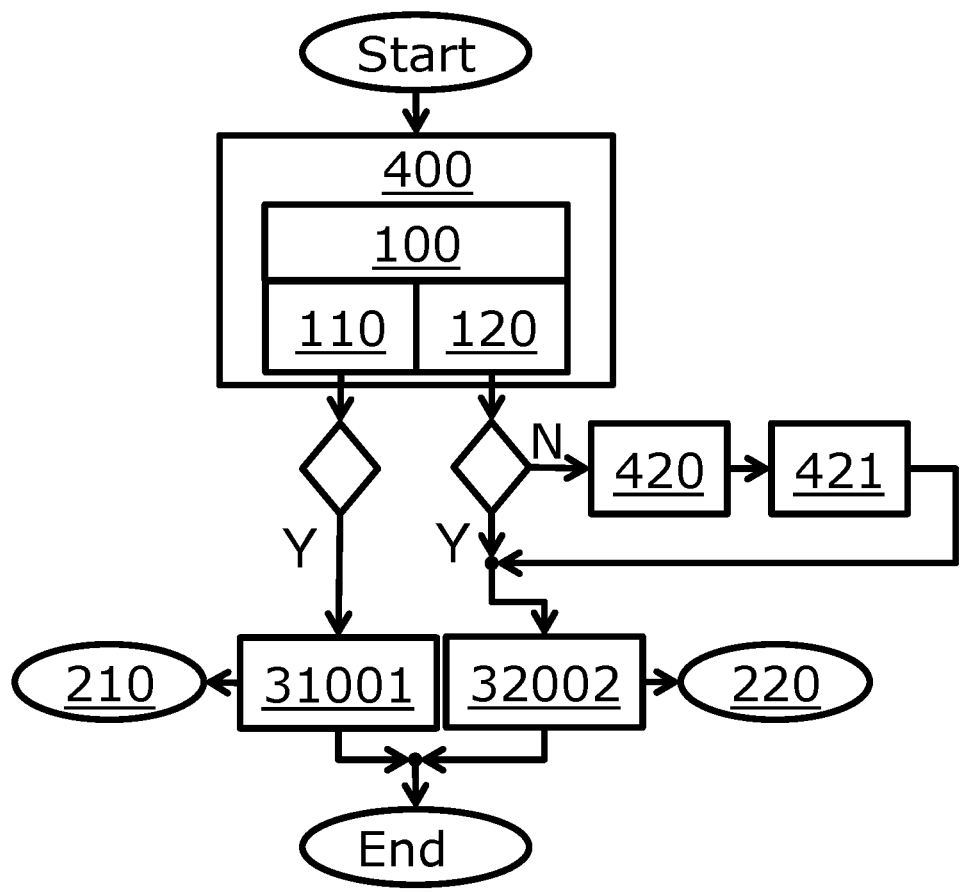
FIG. 1 is a schematic flow chart of a proposed method according to an exemplary embodiment of the invention.

FIG. 1 shows a schematic flow chart of a proposed method according to an exemplary embodiment of the invention.

In doing so, FIG. 1 shows a flow chart of a method for making improved use of flash memory in a microcontroller having electrically erasable programmable read-only memory emulation, with the method comprising the following acts: dividing 400 information 100 to be stored in a computer memory into a first piece of information 110 having executable code and into a second piece of information 120 having non-executable code. If a free storage capacity of a first memory 210 is sufficiently large to receive the first piece of information 110: storing 31001 the first piece of information 110 in the first memory 210. If a free storage capacity of a second memory 220 is sufficiently large to receive the second piece of information 220: storing 32002 the second piece of information 120 in the second memory 220. Or, if the free storage capacity 220 of the second memory 120 is not sufficiently large to receive the second piece of information 120: shutting off 420 an electrically erasable programmable read-only memory emulation of the second memory 220; freeing up 421 the storage capacity no longer required as a result of shutting off 420 the electrically erasable programmable read-only memory emulation of the second memory 220, whereby the free storage capacity of the second memory 220 is increased; and storing 32002 the second piece of information 120 in the second memory 220. In doing so, the first memory 210 allows faster access to the pieces of information stored therein than the second memory 220.

Figure 2:
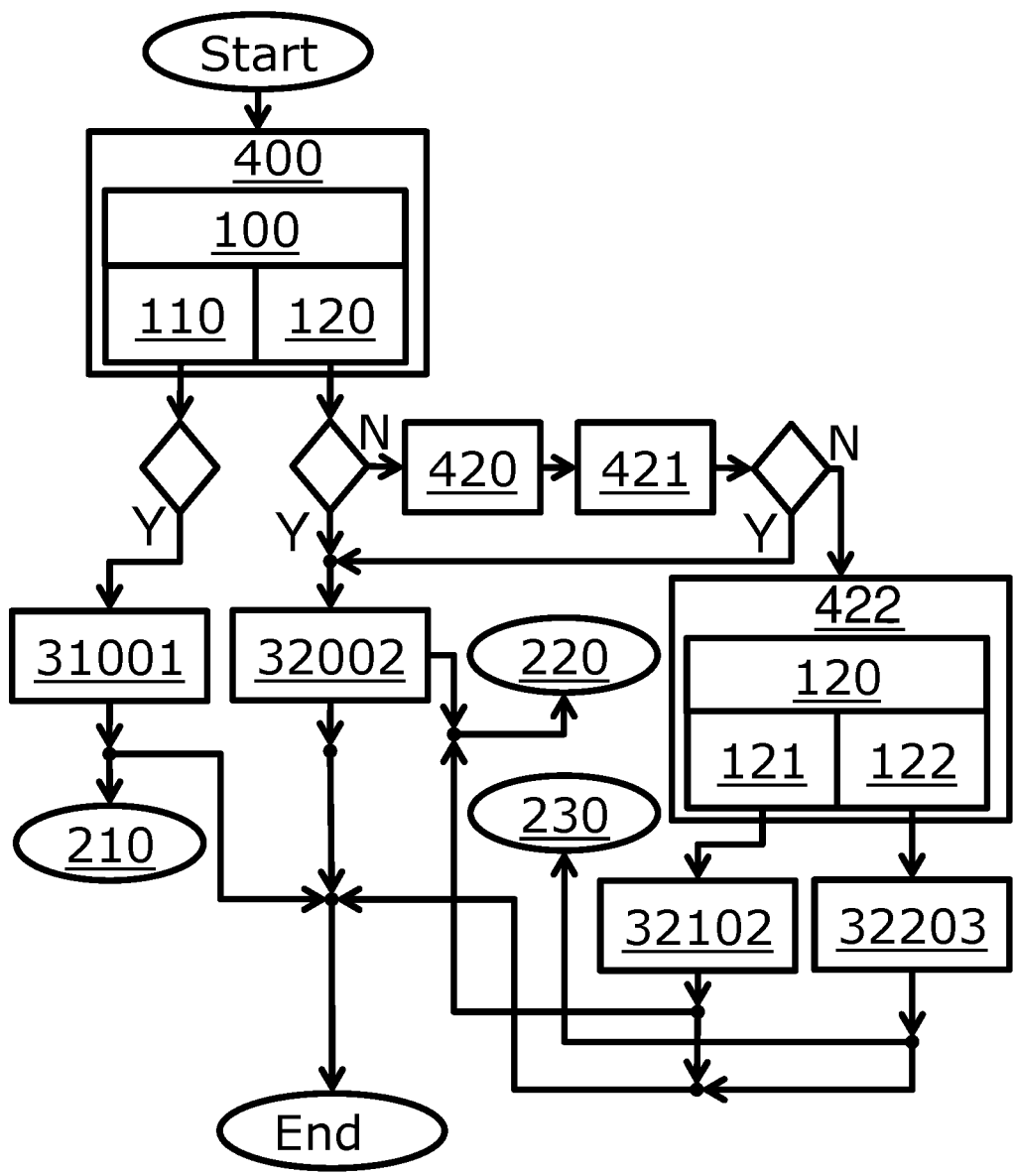
FIG. 2 is a schematic flow chart of a proposed method according to a further exemplary embodiment of the invention.

FIG. 2 shows a schematic flow chart of a proposed method according to a further exemplary embodiment of the invention.

In doing so, FIG. 2 shows a flow chart of a method that is expanded compared to the method of FIG. 1. The description above with respect to FIG. 1 applies correspondingly to FIG. 2.

As can be seen in FIG. 2, the method furthermore includes the following acts: if the free storage capacity of the second memory 220 is not sufficiently large to receive the second piece of information 120 after the storage capacity that is no longer required as a result of shutting off 420 the electrically erasable programmable read-only memory emulation of the second memory 220 has been freed up 421: dividing 422 the second piece of information 120 into a first portion 121 and into a second portion 122, wherein the first portion 121 of the second piece of information 120 has a size that, at a maximum, corresponds to the free storage capacity of the second memory 220. Storing 32102 the first portion 121 of the second piece of information 120 in the second memory 220. Storing 32203 the second portion 122 of the second piece of information 120 in a third memory 230. In doing so, the first memory 210 allows faster access to the pieces of information stored therein than the third memory 230.

Figure 3:
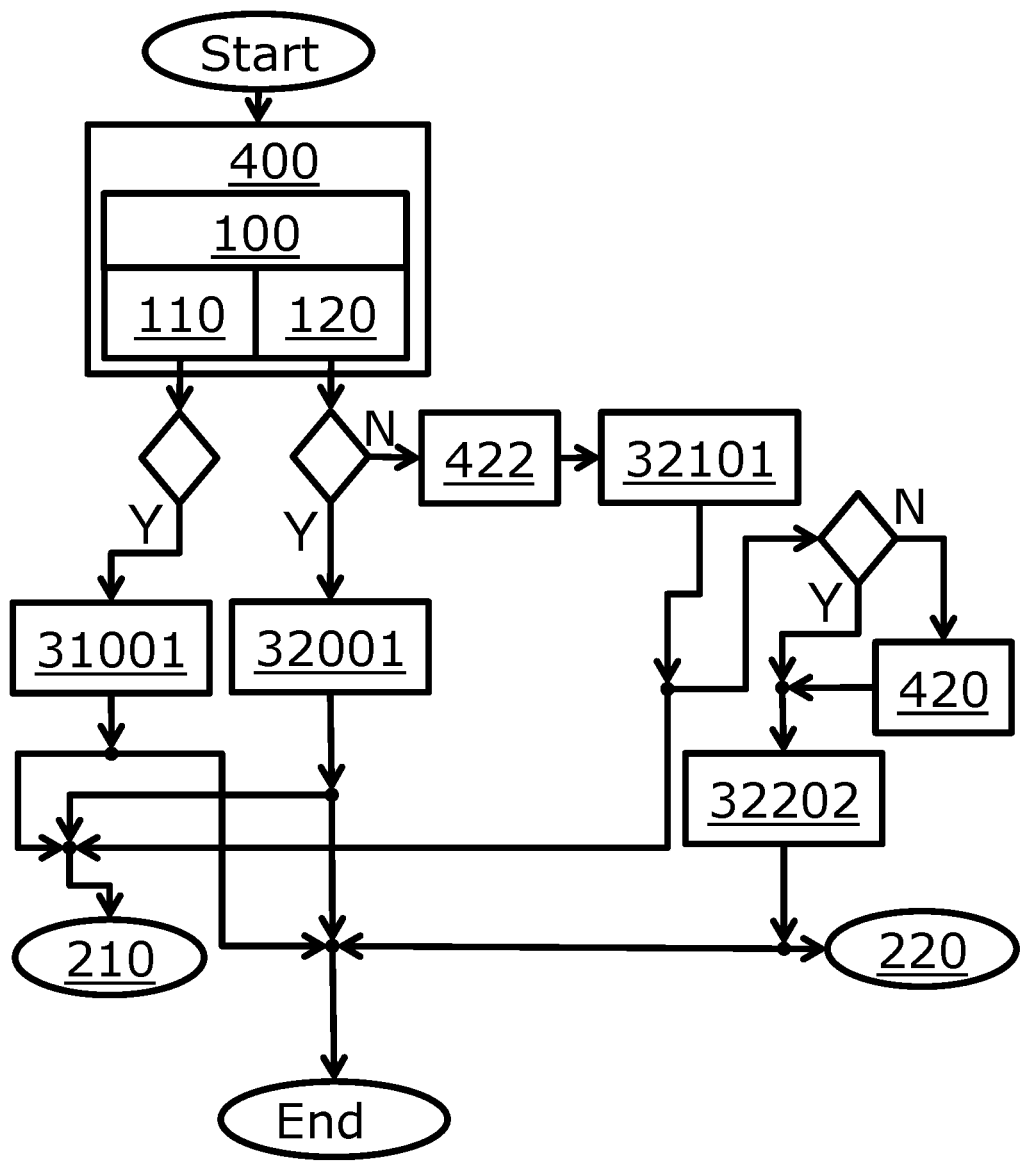
FIG. 3 is a schematic flow chart of a proposed method according to a further exemplary embodiment of the invention.

FIG. 3 shows a schematic flow chart of a proposed method according to a further exemplary embodiment of the invention.

In doing so, FIG. 3 shows a first method for making optimal use of flash memory in a microcontroller having an electrically erasable programmable read-only memory emulation, with the method comprising the following acts: dividing 400 information 100 to be stored in a computer memory into a first piece of information 110 having executable code and into a second piece of information 120 having non-executable code. If a free storage capacity of a first memory 210 is sufficiently large to receive the first piece of information 110: storing 31001 the first piece of information 110 in the first memory 210. If the free storage capacity of the first memory 210 is sufficiently large to receive the second piece of information 120: storing 32001 the second piece of information 120 in the first memory 210. Or, if the free storage capacity of the first memory 210 is not sufficiently large to receive the second piece of information 120: dividing 422 the second piece of information 120 into a first portion 121 and into a second portion 122, wherein the first portion 121 of the second piece of information 120 has a size that, at a maximum, corresponds to the free storage capacity of the first memory 210. Storing 32101 the first portion 121 of the second piece of information 120 in the first memory 210. And, if the free storage capacity of a second memory 220 is sufficiently large to receive the second portion 122 of the second piece of information 120: storing 32202 the second portion 122 of the second piece of information 120 in the second memory 220. Or, if the free storage capacity of the second memory 220 is not sufficiently large to receive the second piece of information 120: shutting off 420 an electrically erasable programmable read-only memory emulation of the second memory 220. Freeing up 421 the storage capacity no longer required as a result of shutting off the electrically erasable programmable read-only memory emulation of the second memory 220, whereby the free storage capacity of the second memory 220 is increased. Storing 32202 the second portion 122 of the second piece of information 120 in the second memory 220. In doing so, the first memory 210 allows faster access to the pieces of information stored therein than the second memory 220.

Figure 4:
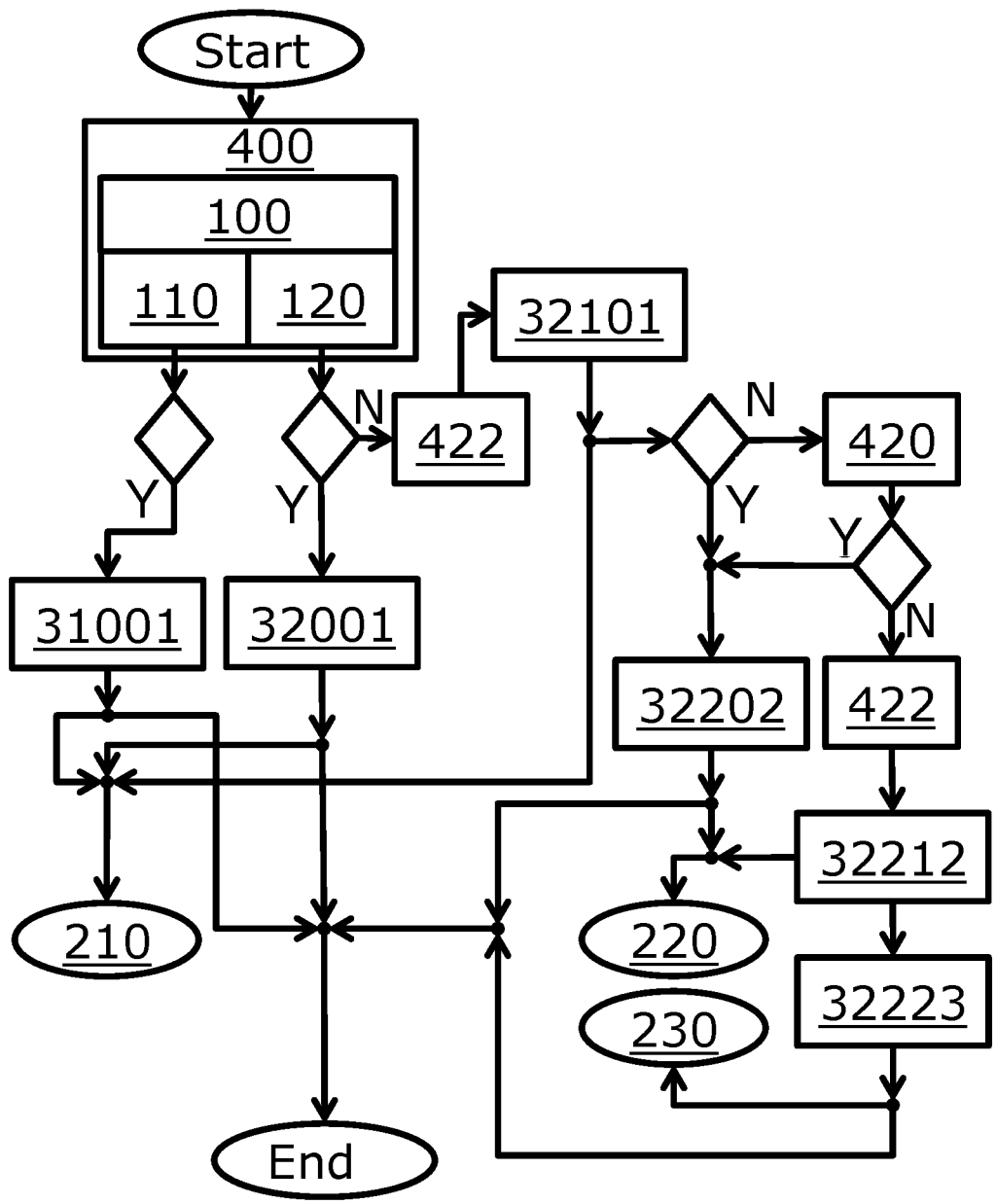
FIG. 4 is a schematic flow chart of a proposed method according to a further exemplary embodiment of the invention.

FIG. 4 shows a schematic flow chart of a proposed method according to a further exemplary embodiment of the invention.

In doing so, FIG. 4 shows a flow chart of a method that is expanded compared to the method of FIG. 3. The description above with respect to FIG. 3 applies correspondingly to FIG. 4.

As can be seen in FIG. 4, the method furthermore includes the following acts: if the free storage capacity of the second memory is not sufficiently large to receive the second portion 122 of the second piece of information 120 after the storage capacity that is no longer required as a result of shutting off 420 the electrically erasable programmable read-only memory emulation of the second memory 220 has been freed up 421: dividing 4222 the second portion 122 of the second piece of information 120 into a first sub-portion and into a second sub-portion, wherein the first sub-portion of the second portion 122 of the second piece of information 120 has a size that, at a maximum, corresponds to the free storage capacity of the second memory 220. Storing 32212 the first sub-portion of the second portion 122 of the second piece of information 120 in the second memory 220. Storing 32223 the second sub-portion of the second portion 122 of the second piece of information 120 in a third memory 230. In doing so, the first memory 210 allows faster access to the pieces of information stored therein than the third memory 230.

The idea of the invention can be summarized as follows: If the aforementioned code increases are only of a limited scope, it becomes possible to use memory areas that conventionally are not used for these purposes, or even go unused, specifically portions of the internal RAM and portions of the internal EEPROM emulation, so as to store code there, which is to say executable program code and/or non-executable program code. In doing so, non-executable program code may be code components such as data and tables. If the particular area is a volatile memory, such as RAM, the only operating condition is that these code portions are reloaded from an external storage medium, such as an external flash component or an external EEPROM, before the actual program is launched, for example after a hardware and/or software reset. The code thus treated remains permanently stored in such an EEPROM even over powerless times of the microcontroller. By using an inexpensive external memory element without particular performance requirements, the transition to a considerably more expensive microcontroller having larger internal flash memory, or to an even more expensive two-processor system, or a still more expensive two control unit system, can be avoided.

LIST OF REFERENCE NUMERALS

100 Information to be stored
110 First piece of information
111 First portion of the first piece of information
112 Second portion of the first piece of information
120 Second piece of information
121 First portion of the second piece of information
122 Second portion of the second piece of information
210 First memory
220 Second memory
230 Third memory
240 Further memory
420 Shutting off an electrically erasable programmable read-only memory emulation of the second memory
421 Freeing up the storage capacity that is no longer needed
422 Dividing the corresponding information into a first portion and into a second portion
500 Expanding the corresponding information The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of using flash memory in a microcontroller having an electrically erasable programmable read-only memory emulation, the method comprising the acts of:
    dividing information to be stored to a computer memory into a first piece of information having executable code and into a second piece of information having non-executable code;
    if a free storage capacity of a first memory is sufficiently large to receive the first piece of information, storing the first piece of information in the first memory;
    if a free storage capacity of a second memory is sufficiently large to receive the second piece of information, storing the second piece of information in the second memory;
    or, if the free storage capacity of the second memory is not sufficiently large to receive the second piece of information, then:
        shutting off an electrically erasable programmable read-only memory emulation of the second memory;
        freeing up the storage capacity no longer required as a result of shutting off the electrically erasable programmable read-only memory emulation of the second memory, whereby the free storage capacity of the second memory is increased; and
        storing the second piece of information in the second memory; and
    wherein the first memory allows faster access to the pieces of information stored therein than the second memory.

2. The method according to claim 1, further comprising the acts of:
    if the free storage capacity of the second memory is not sufficiently large to receive the second piece of information after the storage capacity that is no longer required as a result of shutting off the electrically erasable programmable read-only memory emulation of the second memory has been freed up, then:
        dividing the second piece of information into a first portion and into a second portion, wherein the first portion of the second piece of information has a size that, at a maximum, corresponds to the free storage capacity of the second memory;
        storing the first portion of the second piece of information in the second memory;
        storing the second portion of the second piece of information in a third memory; and
    wherein the first memory allows faster access to the pieces of information stored therein than the third memory.

3. The method according to claim 1, further comprising the acts of:
  if the free storage capacity of the first memory is not sufficiently large to receive the first piece of information, then
    dividing the first piece of information into a first portion and into a second portion, wherein
    the first portion of the first piece of information has a size that, at a maximum, corresponds to the free storage capacity of the first memory;
    storing the first portion of the first piece of information in the first memory; and
    storing the second portion of the first piece of information in the second memory.

4. The method according to claim 3, further comprising the acts of:
  if the free storage capacity of the second memory is not sufficiently large to receive the second portion of the first piece of information, then
    shutting off the electrically erasable programmable read-only memory emulation of the second memory;
    freeing up the storage capacity no longer required as a result of shutting off the electrically erasable programmable read-only memory emulation of the second memory, whereby the free storage capacity of the second memory is increased; and
    storing the second portion of the first piece of information in the second memory.

5. The method according to claim 4, further comprising the acts of:
  if the free storage capacity of the second memory is sufficiently large to receive the second piece of information after shutting off the electrically erasable programmable read-only memory emulation of the second memory, storing the second piece of information in the second memory;
  or, if the free storage capacity of the second memory is not sufficiently large to receive the second piece of information after shutting off the electrically erasable programmable read-only memory emulation of the second memory, then:
    dividing the second piece of information into a first portion and into a second portion, wherein
    the first portion of the second piece of information has a size that, at a maximum, corresponds to the free storage capacity of the second memory;
    storing the first portion of the second piece of information in the second memory; and
    storing the second portion of the second piece of information in a third memory.

6. The method according to claim 4, further comprising the acts of:
  if the free storage capacity of the second memory is not sufficiently large to receive the second portion of the first piece of information after the storage capacity that is no longer required as a result of shutting off the electrically erasable programmable read-only memory emulation of the second memory has been freed up, then:
    dividing the second portion of the first piece of information into a first sub-portion and into a second sub-portion, wherein
    the first sub-portion of the second portion of the first piece of information has a size that, at a maximum, corresponds to the free storage capacity of the second memory;
    storing the first sub-portion of the second portion of the first piece of information in the second memory;
    storing the second sub-portion of the second portion of the first piece of information in a third memory;
    storing the second piece of information in the third memory and/or a further memory; and
  wherein the second memory allows faster access to the pieces of information stored therein than the third memory and/or the further memory.

7. The method according to claim 3, further comprising the acts of:
  if the free storage capacity of the second memory is sufficiently large to receive the second piece of information, storing the second piece of information in the second memory;
  or, if the free storage capacity of the second memory is not sufficiently large to receive the second piece of information, then:
    shutting off the electrically erasable programmable read-only memory emulation of the second memory;
    freeing up the storage capacity no longer required as a result of shutting off the electrically erasable programmable read-only memory emulation of the second memory, whereby the free storage capacity of the second memory is increased; and
    storing the second piece of information in the second memory.

8. The method according to claim 7, further comprising the acts of:
  if the free storage capacity of the second memory is not sufficiently large to receive the second piece of information after the storage capacity that is no longer required as a result of shutting off the electrically erasable programmable read-only memory emulation of the second memory has been freed up, then:
    dividing the second piece of information into a first portion and into a second portion, wherein
    the first portion of the second piece of information has a size that, at a maximum, corresponds to the free storage capacity of the second memory;
    storing the first portion of the second piece of information in the second memory;
    storing the second portion of the second piece of information in a third memory; and
  wherein the second memory allows faster access to the pieces of information stored therein than the third memory.

9. The method according to claim 1, further comprising the acts of:
  prior to storing corresponding information, a corresponding portion of the corresponding information, or a corresponding sub-portion of the corresponding portion of the corresponding information, in a corresponding memory:
  expanding the corresponding information, the corresponding portion of the corresponding information, or the corresponding sub-portion of the corresponding portion of the corresponding information from the second memory, the third memory and/or the further memory; and
  wherein the first memory allows faster access to the pieces of information stored therein than the further memory.

10. A method of using flash memory in a microcontroller having an electrically erasable programmable read-only memory emulation, the method comprising the acts of:

dividing an information to be stored in a computer memory into a first piece of information having executable code and into a second piece of information having non-executable code;

if a free storage capacity of a first memory is sufficiently large to receive the first piece of information, storing the first piece of information in the first memory;

if the free storage capacity of the first memory is sufficiently large to receive the second piece of information, storing the second piece of information in the first memory, or, if the free storage capacity of the first memory is not sufficiently large to receive the second piece of information, then:

dividing the second piece of information into a first portion and into a second portion, wherein the first portion of the second piece of information has a size that, at a maximum, corresponds to the free storage capacity of the first memory;

storing the first portion of the second piece of information in the first memory; and if the free storage capacity of a second memory is sufficiently large to receive the second portion of the second piece of information, storing the second portion of the second piece of information in the second memory;

or, if the free storage capacity of the second memory is not sufficiently large to receive the second piece of information, then:

shutting off an electrically erasable programmable read-only memory emulation of the second memory;

freeing up the storage capacity no longer required as a result of shutting off the electrically erasable programmable read-only memory emulation of the second memory, whereby the free storage capacity of the second memory is increased;

storing the second portion of the second piece of information in the second memory; and wherein the first memory allows faster access to the pieces of information stored therein than the second memory.

11. The method according to claim 10, further comprising the acts of:

if the free storage capacity of the second memory is not sufficiently large to receive the second portion of the second piece of information after the storage capacity that is no longer required as a result of shutting off the electrically erasable programmable read-only memory emulation of the second memory has been freed up, then:

dividing the second portion of the second piece of information into a first sub-portion and into a second sub-portion, wherein the first sub-portion of the second portion of the second piece of information has a size that, at maximum, corresponds to the free storage capacity of the second memory;

storing the first sub-portion of the second portion of the second piece of information in the second memory;

storing the second sub-portion of the second portion of the second piece of information in a third memory; and wherein the first memory allows faster access to the pieces of information stored therein than the third memory.

12. A microcontroller device, comprising:

a processor;

a first memory; and a second memory, wherein the first memory
allows random access,
allows executable code to be executed, and faster access to pieces of information stored therein than the second memory;

wherein:

the second memory is a flash memory, which allows electrically erasable programmable read-only memory emulation, the electrically erasable programmable read-only memory emulation of the second memory can be shut off; and the processor is programmed to carry out a method of:

dividing information to be stored to a computer memory into a first piece of information having executable code and into a second piece of information having non-executable code;

if a free storage capacity of a first memory is sufficiently large to receive the first piece of information, storing the first piece of information in the first memory;

if a free storage capacity of a second memory is sufficiently large to receive the second piece of information, storing the second piece of information in the second memory;

or, if the free storage capacity of the second memory is not sufficiently large to receive the second piece of information, then:

shutting off an electrically erasable programmable read-only memory emulation of the second memory;

freeing up the storage capacity no longer required as a result of shutting off the electrically erasable programmable read-only memory emulation of the second memory, whereby the free storage capacity of the second memory is increased; and storing the second piece of information in the second memory; and wherein the first memory allows faster access to the pieces of information stored therein than the second memory.

13. The device according to claim 12, further comprising:

a third memory, wherein the third memory allows faster access to the pieces of information stored therein than the second memory; and wherein the third memory is an electrically erasable programmable read-only memory.

14. The device according to claim 13, further comprising:

a further memory, wherein the first memory allows faster access to the pieces of information stored therein than the further memory; and wherein the second memory and/or third memory allow faster access to the pieces of information stored therein than the further memory.

15. A microcontroller device, comprising:

a processor;

a first memory; and a second memory, wherein the first memory
allows random access,
allows executable code to be executed, and faster access to pieces of information stored therein than the second memory;

wherein:

the second memory is a flash memory, which allows electrically erasable programmable read-only memory emulation, the electrically erasable programmable read-only memory emulation of the second memory can be shut off; and the processor is programmed to carry out a method of:
dividing an information to be stored in a computer memory into a first piece of information having executable code and into a second piece of information having non-executable code;
if a free storage capacity of a first memory is sufficiently large to receive the first piece of information, storing the first piece of information in the first memory;
if the free storage capacity of the first memory is sufficiently large to receive the second piece of information, storing the second piece of information in the first memory,
or, if the free storage capacity of the first memory is not sufficiently large to receive the second piece of information, then:
   dividing the second piece of information into a first portion and into a second portion, wherein
   the first portion of the second piece of information has a size that, at a maximum, corresponds to the free storage capacity of the first memory;
   storing the first portion of the second piece of information in the first memory; and
   if the free storage capacity of a second memory is sufficiently large to receive the second portion of the second piece of information, storing the second portion of the second piece of information in the second memory;
   or, if the free storage capacity of the second memory is not sufficiently large to receive the second piece of information, then:
   shutting off an electrically erasable programmable read-only memory emulation of the second memory;
   freeing up the storage capacity no longer required as a result of shutting off the electrically erasable programmable read-only memory emulation of the second memory, whereby the free storage capacity of the second memory is increased;
   storing the second portion of the second piece of information in the second memory; and
wherein the first memory allows faster access to the pieces of information stored therein than the second memory.

* * * * *